(12) United States Patent
Bradbury et al.

(10) Patent No.: US 8,739,830 B2
(45) Date of Patent: Jun. 3, 2014

(54) IRRIGATION SYSTEMS AND METHODS

(75) Inventors: Stuart Francis Bradbury, Feilding (NZ); Michael George Ricketts, Palmerston North (NZ)

(73) Assignee: Lindsay Corporation, Omaha, NE (US)

( * ) Notice: Subject to any disclaimer, the term of this patent is extended or adjusted under 35 U.S.C. 154(b) by 887 days.

(21) Appl. No.: 12/463,306

(22) Filed: May 8, 2009

(65) Prior Publication Data

US 2009/0277506 A1 Nov. 12, 2009

(30) Foreign Application Priority Data

May 12, 2008 (NZ) .................................. NZ568218

(51) Int. Cl.
*B05B 12/02* (2006.01)
*F16K 51/00* (2006.01)
*A01G 25/16* (2006.01)

(52) U.S. Cl.
USPC .............. 137/624.12; 137/236.1; 251/129.04; 239/69

(58) Field of Classification Search
USPC .................. 137/624.11, 624.12, 1, 78.2, 268, 137/236.1; 239/69; 251/129.04
See application file for complete search history.

(56) References Cited

U.S. PATENT DOCUMENTS

| | | | |
|---|---|---|---|
| 4,004,612 A | 1/1977 | Hummel, Jr. et al. | |
| 5,023,787 A | 6/1991 | Evelyn-Veere | |
| 5,139,044 A * | 8/1992 | Otten et al. | 137/78.2 |
| 5,246,164 A | 9/1993 | McCann et al. | |
| 5,255,857 A * | 10/1993 | Hunt | 239/731 |
| 5,465,904 A * | 11/1995 | Vaello | 239/69 |
| 5,479,339 A | 12/1995 | Miller | |
| 5,740,031 A | 4/1998 | Gagnon | |
| 5,740,038 A | 4/1998 | Hergert | |
| 5,884,224 A | 3/1999 | McNabb | |
| 5,914,847 A | 6/1999 | Alexanian et al. | |
| 5,927,603 A * | 7/1999 | McNabb | 239/69 |
| 5,947,393 A | 9/1999 | Unruh | |
| 6,007,004 A | 12/1999 | Unruh | |
| 6,036,121 A | 3/2000 | Gerdes | |
| 6,045,066 A | 4/2000 | Gerdes et al. | |
| 6,102,061 A | 8/2000 | Addink | |

(Continued)

FOREIGN PATENT DOCUMENTS

| | | |
|---|---|---|
| NZ | 202241 | 5/1987 |
| NZ | 216175 | 2/1990 |

(Continued)

OTHER PUBLICATIONS

Lindsay Corporation, "The GrowSmart GPS Controller for pinpoint accuracy," GPS Controller, Product Information Brochure, 2007, 2 pgs.

*Primary Examiner* — Kevin Lee
(74) *Attorney, Agent, or Firm* — Hovey Williams LLP

(57) ABSTRACT

An irrigation system includes a control arrangement which receives field information relating to an area to be irrigated and source information relating to one or more water sources which supply water to the irrigation system. The control arrangement optimizes an irrigation plan based on the field information and source information and then controls one or more irrigators in accordance with the plan. The control arrangement may pulse valves positioned on the irrigator on and off in order to control the amount of water applied to the land by individual outlets on the irrigator. Latching valves may be used.

27 Claims, 9 Drawing Sheets

(56) References Cited

U.S. PATENT DOCUMENTS

| | | |
|---|---|---|
| 6,230,091 B1 | 5/2001 | McQuinn |
| 6,666,384 B2 | 12/2003 | Prandi |
| 6,705,553 B2 | 3/2004 | Drechsel |
| 6,877,675 B2 | 4/2005 | Benneweis |
| 6,928,339 B2 | 8/2005 | Barker |
| 6,938,842 B2 | 9/2005 | Choat et al. |
| 7,315,800 B2 | 1/2008 | Meiners et al. |
| 7,805,221 B2 * | 9/2010 | Nickerson ............... 239/69 |
| 7,844,368 B2 * | 11/2010 | Alexanian ............... 239/69 |
| 2006/0027677 A1 | 2/2006 | Abts |
| 2006/0157580 A1 | 7/2006 | Regli |
| 2007/0185621 A1 | 8/2007 | Gilmore |
| 2008/0142614 A1 | 6/2008 | Elezaby |
| 2008/0154437 A1 | 6/2008 | Alexanian |
| 2009/0039173 A1 | 2/2009 | Mammon |

FOREIGN PATENT DOCUMENTS

| | | |
|---|---|---|
| NZ | 502118 | 3/2001 |
| NZ | 506980 | 4/2003 |
| NZ | 519256 | 11/2003 |
| NZ | 548944 | 6/2008 |
| NZ | 551794 | 7/2008 |
| WO | WO 9727733 | 8/1997 |
| WO | WO 9728692 | 8/1997 |
| WO | WO 2005102029 | 11/2005 |
| WO | WO 2008057314 | 5/2008 |

* cited by examiner

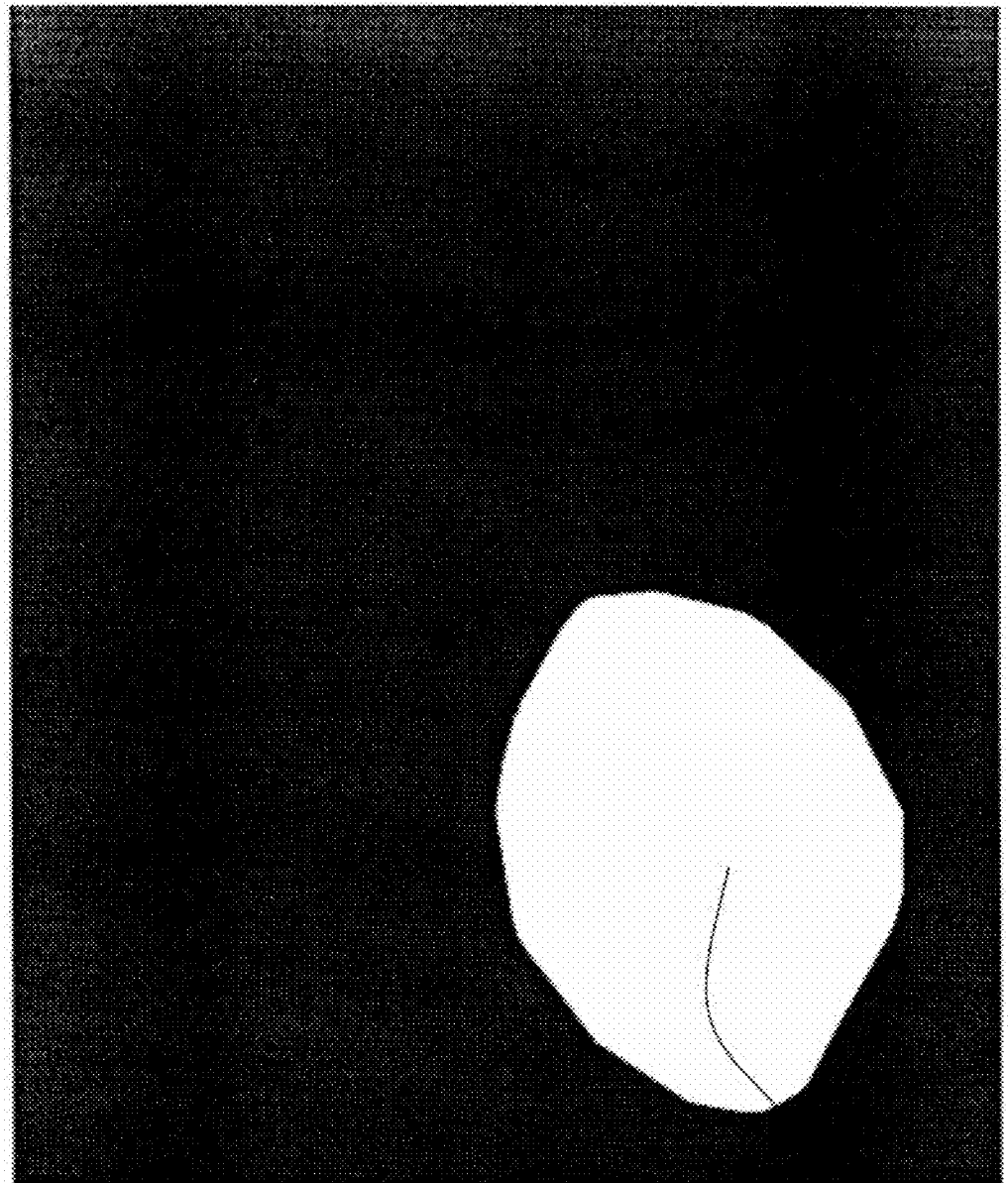

IRRIGATION SYSTEMS AND METHODS

FIELD OF THE INVENTION

The invention relates to irrigation, in particular to variable rate irrigation systems and control of such systems.

BACKGROUND TO THE INVENTION

Many different irrigation systems are known. Irrigation systems which move over the ground allow large areas to be irrigated automatically. In general, such systems simply apply a uniform amount of water to all irrigated regions. Examples include centre-pivot irrigators, lateral-move irrigators and older technology such as rotating boom irrigators.

As farm technology develops, control of irrigation systems is becoming more sophisticated. Efficient use of water is increasingly important due to water shortages, increasing demand and resource quota systems which limit the amount of water available to individual farms. Furthermore, over or under watering results in lost productivity.

Therefore it is desirable to control application so as to provide an optimal amount of water to each region to be irrigated. This requires control systems capable of controlling irrigator outlets as opposed to simply turning whole irrigators on or off.

Control of irrigator outlets is problematic. Commonly, high power solenoid valves are used, wired into the high voltage power line which runs along the length of a modern centre-pivot irrigator. However, fitting such systems to an irrigator requires rewiring that must be carried out by a qualified electrician. Solenoid valves also use large amounts of power. Other options include pneumatic or hydraulic valves. These options also require separate solenoid operated valves and plumbing to be installed for control of the flow of water or air switching the valves.

While some systems allow irrigator outlets to be controlled, the control systems are limited. Control systems focus entirely on the irrigation needs of the area to be irrigated rather than the optimal use of available resources.

It is an object of the invention to provide an improved irrigation system and method and/or an improved irrigation control system, or at least to provide the public with a useful choice.

SUMMARY OF THE INVENTION

In a first aspect the invention provides an irrigation system including:
a plurality of water outlets for delivering water to an area to be irrigated;
a plurality of valves for controlling flow through the outlets;
a control arrangement configured to receive source information relating to a water source and to control the valves so as to control flow through the outlets based at least in part on the source information.

In a second aspect the invention provides an irrigation system including:
a plurality of water outlets for delivering water to an area to be irrigated;
a plurality of latching valves for controlling flow through the outlets; and
a control arrangement configured to control the latching valves so as to control flow through the outlets in accordance with an irrigation plan.

In a third aspect the invention provides an irrigation system including:
a plurality of water outlets for delivering water to an area to be irrigated;
a control arrangement configured to receive source information relating to a water source and to control irrigation parameters based at least in part on the source information.

In a fourth aspect the invention provides a method of controlling an irrigation system, including:
receiving source information relating to a water source;
receiving field information relating to an area to be irrigated; and
controlling irrigation parameters in accordance with the source information and the field information.

BRIEF DESCRIPTION OF THE DRAWINGS

The invention will now be described by way of example only, with reference to the accompanying drawings, in which:

FIGS. 6A to 6D are screenshots showing how an irrigation plan may be formed.

DETAILED DESCRIPTION

In general, the Applicant's system controls irrigator and ground speed and water outlets (by switching valves on and off) to vary the application of water as required by a number of inputs. The Applicant's system may advantageously be applied to moving irrigators. However, some aspects of the Applicant's system may also be useful in fixed irrigation systems, such as fixed vineyard irrigation systems, for example.

Figure 1:
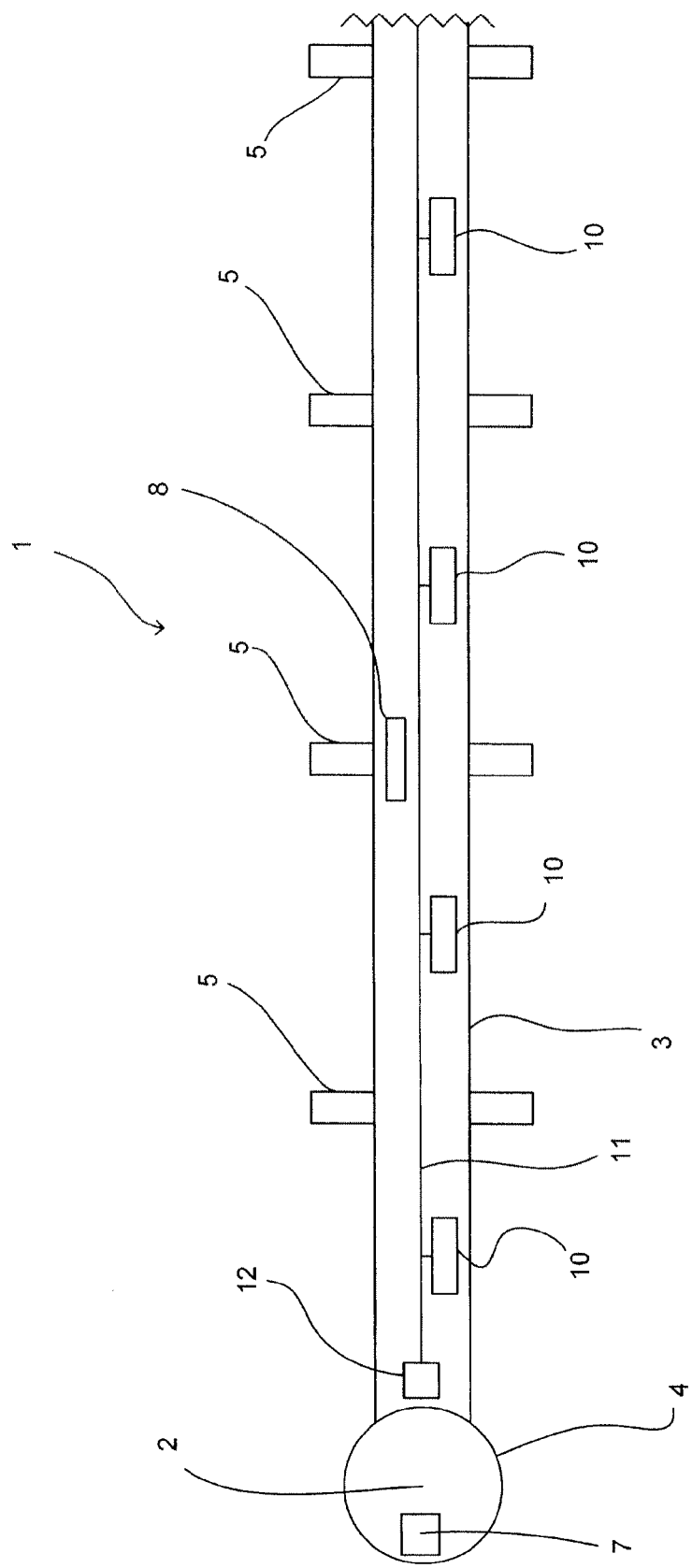
FIG. 1 is a schematic diagram of part of an irrigation system.

FIG. 1 is a schematic diagram showing a part of an irrigator 1 which forms part of a larger irrigation system. In this specification the term "irrigation system" means one or more irrigators with one or more appropriate control systems. Each irrigator may be a centre-pivot, lateral-move or other suitable irrigator.

In the embodiment shown, the irrigator 1 is a centre-pivot irrigator which pivots around a central point 2. In general, the structure of such irrigators is well known and need not be described in detail here. A brief description is however given below.

A pipe 3 extends from the central point 2 and water is pumped into the pipe through a rotating coupling 4. Water is then pumped through outlets (not shown in FIG. 1) from the pipe 3 onto the field or other area to be irrigated. Various outlets (such as sprinklers, fixed outlets, drag hoses etc) may be used as will be apparent to the skilled reader.

The pipe 3 is supported along its length by a number of towers 5, each of which rides on a number of wheels. At least one wheel at each tower 5 is generally powered, to drive rotation of the pipe 3 around the centre point 2. The wheels are usually powered by electricity (typically three phase power at 400-415V in New Zealand) drawn from a single electrical power line (not shown) running along the length of the pipe 3. Towers can also be propelled by hydraulic means. In the Applicant's system, the speed of irrigator movement may be controlled, either by control of the electric motors or the hydraulic system powering the wheels.

The three phase power line generally also powers a boost-pump for the end gun which distributes water beyond the end of the pipe 3.

A number of signal lines (e.g. 110 V AC signal lines) may also be provided along the irrigator pipe for sending on/off signals to the towers (for example, for control of movement direction or speed).

In one embodiment of the Applicant's system, one or more positioning systems are provided for determining the position of the irrigator.

When a centre pivot irrigator is used, various methods may be used to determine the angular position of the pipe 3. A shaft encoder 7, such as an optical encoder, may be mounted in or near the rotating coupling 4.

Alternatively, one or more GPS receivers 8 may be mounted on the pipe 3, providing an absolute position which can if necessary be converted to an angular position. Mounting several GPS receivers 8 along the length of the pipe allows for more accurate determination of position, since a long pipe often does not run in a precisely straight line.

Where a lateral-move irrigator is used, GPS receivers can be used in a similar fashion to provide the irrigator position.

The Applicant's system also includes a number of node controllers 10. Each node controller is configured to receive node control signals and to control flow through a number of outlets, as described below.

The node controllers are preferably powered by a common low voltage power line 11 which runs along the length of the pipe 3. Here the term "low voltage" means voltages of around 32 V or less for AC power, or around 115 V or less for DC power. A 24V direct current (DC) power line may be suitable. The use of such a power source means that, at least in New Zealand, the node controllers and power line do not need to be installed by a registered electrician.

Although transformers could be provided at each node controller to draw power from the high voltage line (providing power to the irrigator wheels at towers 5), they would have to be installed by an electrician and would result in unnecessary expense.

In contrast, one embodiment of the Applicant's system requires only a single transformer 12 at or near the centre point. The transformer 12 draws power from the high voltage line and provides 24V DC to the power line 11. Alternatively, several switch mode power supplies along the length of the irrigator pipe 3 could be used. These are capable of taking a range of input voltages and outputting a desired DC voltage, e.g. 24 V. Other possible low voltage supplies will occur to a skilled reader.

Figure 2:
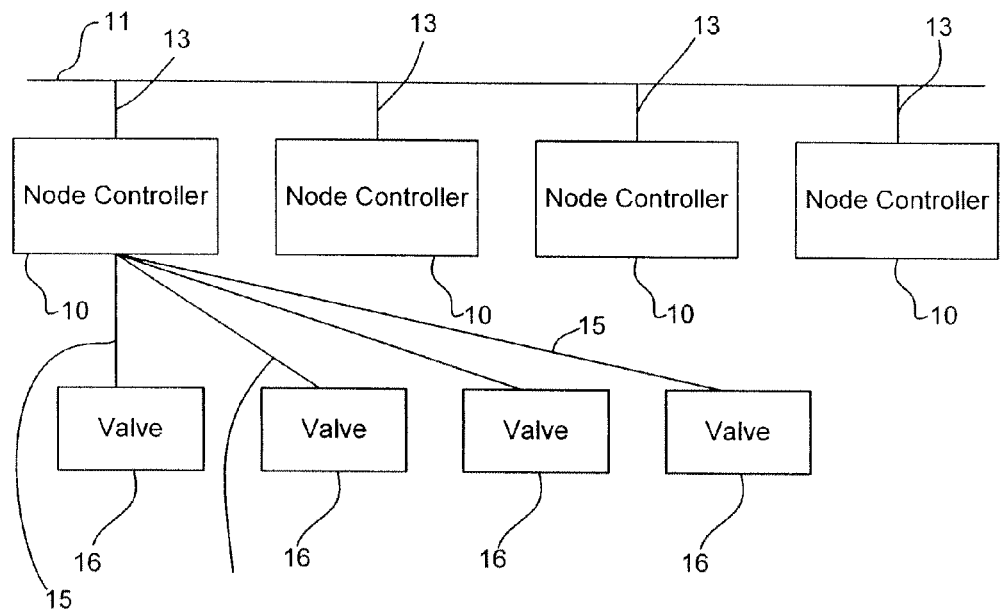
FIG. 2 is a schematic diagram showing power supply to some components of an irrigation system.

FIG. 2 is a schematic diagram showing the low voltage power line 11, supplying power to a number of node controllers 10 via branch lines 13. In turn, each node controller provides both power and control signals via wired connections 15 to a number of valves 16 (for example, four valves). For clarity, the valves connected to only one of the node controllers are shown. The power and control signals may be combined such that the power provided by the control signal powers the valve on or off. The Applicant's power and control system may also be used to control other electrical systems, such as scissor or other valves in an effluent application rig.

Each valve 16 controls the flow of water through a number of outlets, i.e. a subset of the irrigator's outlets. Preferably each valve 16 controls the flow of water through a single outlet, but for some applications it may be satisfactory for a group of outlets to be supplied through a single valve.

The valves 16 are preferably latching valves, such as magnetic latching solenoid valves. This means that the valve is stable in either an "on" or an "off" state, requiring no power to maintain it in that state. Power is supplied only when it is necessary to actuate the valve, moving it from one position to the other.

This can be contrasted with ordinary solenoid valves, which generally require power to maintain them in at least one of an "on" or "off" state. The use of latching valves is therefore advantageous for reduced power consumption, and also allows the valves to be run from a low power source, such as the power line 11.

Power requirements may be further reduced by requiring that only a subset of the valves can be actuated at any one time. Preferably only a single valve per valve power supply may be actuated at any one time.

Where droppers are used from the pipe 3, the valves may be provided at the "gooseneck" (between the main pipe 3 and the dropper) or between the dropper hose and the sprinkler or other outlet.

Figure 3:
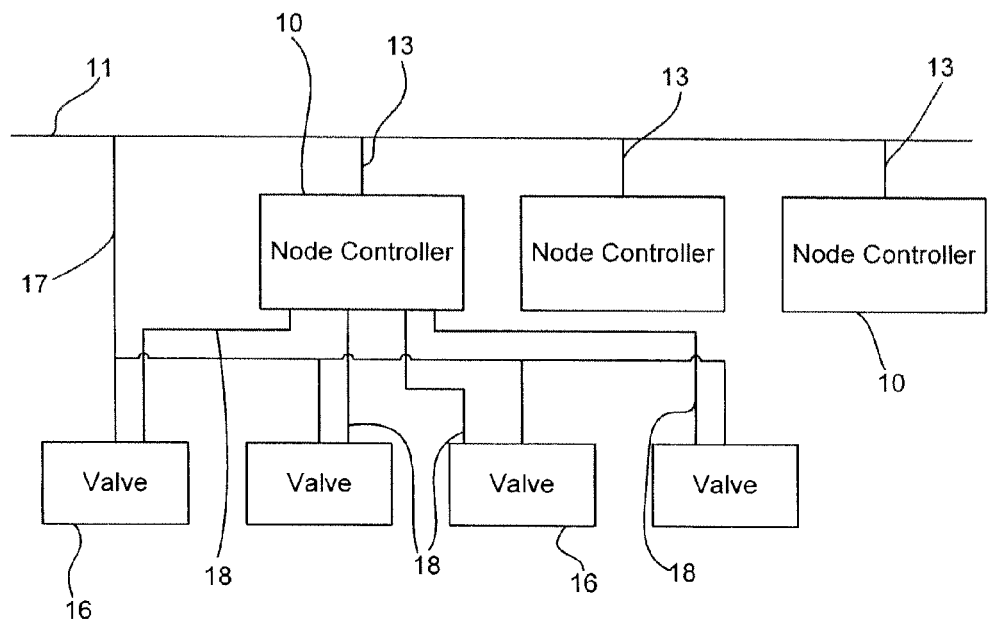
FIG. 3 shows an alternative power supply arrangement.

FIG. 3 shows an alternative arrangement in which the valves are powered by a further branch line 17 from the power line 11. Wired communications lines 18 link the node controllers 10 and the valves 16.

Figure 4:
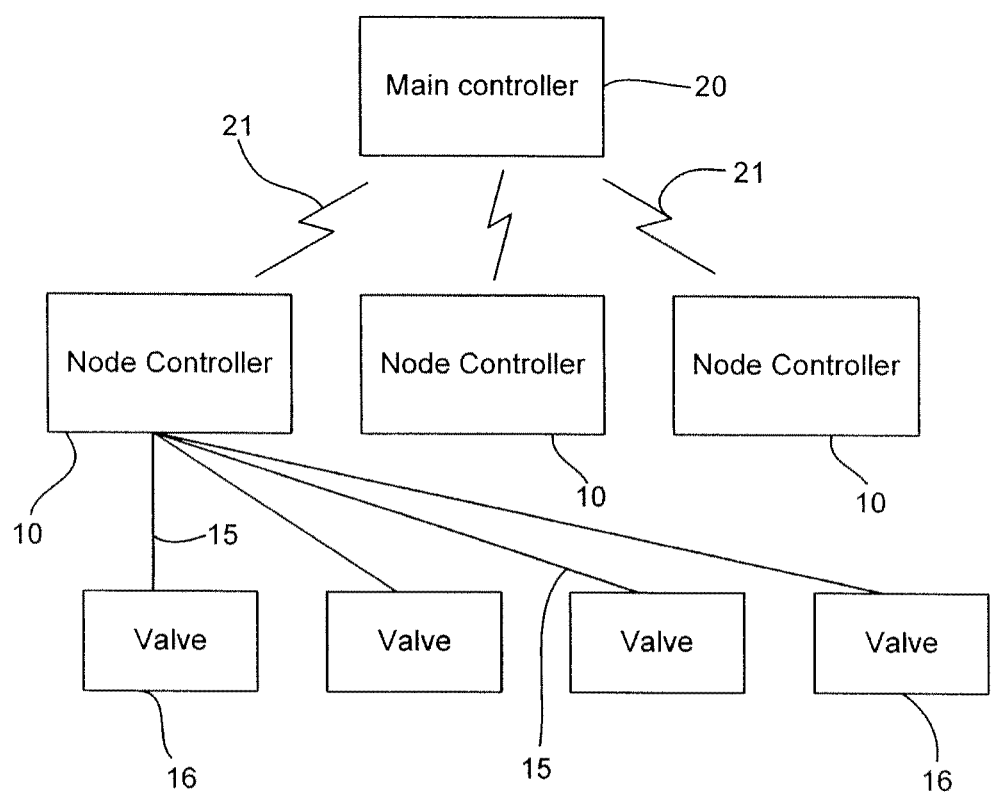
FIG. 4 shows how control signals are communicated between components.

FIG. 4 is a schematic diagram showing the control network for control of the valves. A main controller 20 communicates, preferably over wireless links 21, with the node controllers 10. The main controller may be situated at or near the centre of the irrigator. The node controllers 10 in turn communicate with the valves 16 over the wired links 15. The node controllers preferably act as repeaters in the wireless link 21. This allows the Applicant's system to be easily fitted to irrigators of any length, since any number of control nodes can be added, each acting as a repeater in the communications link. Any failure is also easily fixed, since only the node/repeater that has failed need be replaced. In addition, nodes/repeaters can communicate with other nodes several nodes down the irrigator, so if one node fails, it will drop out of the network and nodes on either side of it will communicate with each other. FIG. 4 shows a node controller 10' which acts as a repeater for communications between the main controller 20 and the node controller 10".

The node control signals are more sophisticated than the on/off or pulse signals in prior systems. The node control signals are packet-based. This mode of communication is flexible, in that any information desirable for control of the irrigator can be transmitted to the nodes.

Figure 5:
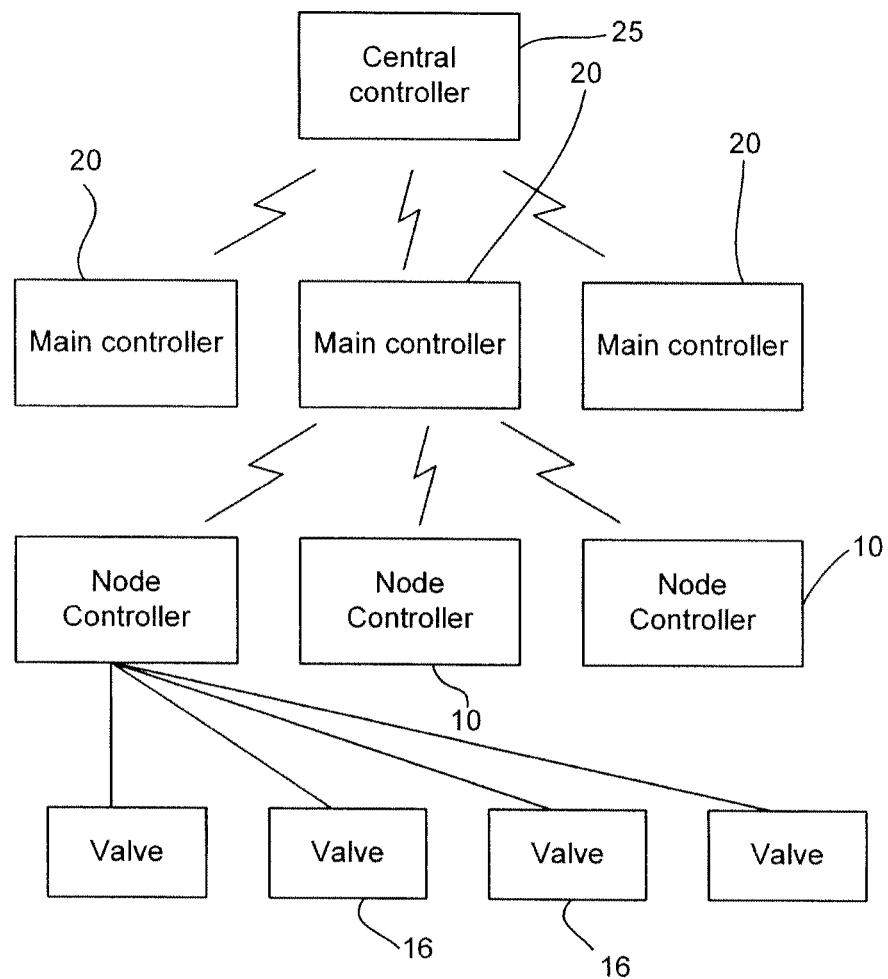
FIG. 5 shows an alternative communication arrangement.

FIG. 5 shows an alternative control network which is particularly suited to control of more than one irrigator. A central controller 25 provides irrigator control signals to a number of main controllers 20, preferably by wireless link. Each main controller is associated with a single irrigator and supplies node control signals to node controllers on that irrigator, as described above. For clarity, the node controllers and valves for only one irrigator are shown.

Thus, the irrigation system generally includes a control arrangement capable of controlling irrigation parameters. The irrigation parameters include valve position of each individual valve, which can be controlled so as to control water flow through outlets. The irrigation parameters preferably also include the speed at which each irrigator moves over the area being irrigated. For control of speed, the control arrangement controls the driven wheels of the towers 5. Other irrigation parameters include fertilizer, effluent and/or chemical application parameters, end gun control, irrigator movement direction, system start-stop and service interval times.

By control of irrigator speed and valves 16, the amount of water applied to each area can be carefully controlled, optimising water application. Water application can be optimised based on any suitable input information. The control arrangement receives input information and forms an irrigation plan. The input information includes source information and field information.

Source information relates to the water source supplying water to the irrigation system. Modern irrigation systems draw water from a number of different sources, including wells, water races, rivers and reservoirs. Water is pumped from the source into a pipeline for supply to the irrigators. Pumps are often variable speed drive (VSD) pumps, which react to changes in water output to stay within a predetermined set of pump values. For example, VSD pumps may be configured to alter their pumping rate to stay within predetermined maximum and minimum pressures.

In contrast, the Applicant's system configures water output so as to optimise use of the water source. The source information preferably includes source pressure parameters, such as a minimum and maximum pressure, or a current (i.e. actual) pressure, provided by the pump; and source flow parameters, such as a minimum and maximum flow rate, or a current (i.e. actual) flow rate provided by the pump.

The source information can also include water quota information, i.e. a maximum volume or flow rate of water that can be used. In New Zealand, for example, water use is regulated through a local government consent process. A farmer may therefore have a maximum flow or volume of water that can legally be taken from a particular source.

Each irrigation system may of course have more than one source. For example, a farm may have two or more wells or a number of wells and a river or irrigation channel source. 'Source information' may therefore include information on two or more sources.

The water output can be planned in accordance with the source information. In addition, the source information can be monitored in real time, and real time alterations to the irrigator parameters made by the control arrangement.

As an example, if one irrigator requires a large amount of water for one part of its irrigation programme, the control arrangement may determine that in order to stay within the specifications of the source information one or more irrigators should reduce their water output by slowing down and applying less water.

Some information, such as pressure or flow can be measured at the pump, at the irrigator, at several irrigators or even at multiple points in the irrigation system. This allows the irrigation plan to be implemented based on pressures and flows throughout the system and for the system to check that water is being allocated as intended.

Field information relates to the area to be irrigated. Field information can include collected data, such as aerial photographs, soil moisture maps, conductivity maps, crop temperature maps, soil temperature maps, infra-red image maps, soil-type maps and the like. Any number of types or "layers" of field information can be used.

Aerial photographs show changes in colouration, which can be used to infer moisture variations in the soil.

Areas with naturally greater soil moisture need less water than dry areas. Areas at the bottom of slopes need less water, since water will naturally flow down the slope. Low lying areas tend to dry more slowly, so require less irrigation. Certain crop types may require less water than others. Various other factors will occur to the skilled reader.

Field information can also include user-defined information. For example, a user can manually define an area which is not to be irrigated (and 'avoidance layer'). Watering of water races, ponds, farm tracks, paddocks currently occupied by stock, non-productive areas or other areas where irrigation is undesirable can therefore be avoided. A user can also define terrain, such as sloping ground (or this information could be gathered using a suitable GPS-based system).

Field information can also include user defined crop parameters, such as crop type, stage of growth cycle, time to harvest etc. This allows water application to be optimised. For example, it may be beneficial to apply 5 mm of water to pasture, while applying 10 mm to a potato crop in an adjacent field and no water to a wheat crop which is close to harvest.

The field information can also include historical data relating to the area to be irrigated. For example, yield data can be collected during harvest and mapped against the area by using a GPS receiver on the harvester. In subsequent years, historical yield data can be used to plan irrigation.

Field information may also include weed population information, farmer's knowledge (such as knowledge of compacted areas), and various types of data gathered from farm machinery as it works the soil, during planting etc. Tractors, harvesters and other machinery can be equipped with appropriate sensors and/or positioning systems for gathering of field data. Field information can also be gathered using hand-held sensors (e.g. conductivity sensors), preferably equipped with GPS receivers.

Such primary field information can be processed to provide secondary field information. For example, conductivity information can be combined with other field information relating to soil type etc to provide an available water holding capacity (AWHC) map. An AWHC map provides an indication of the maximum amount of water that the soil can hold across the area to be irrigated.

The irrigator hardware described above provides complete flexibility of application, and the source information and field information is used to provide an irrigation plan which is optimised for both the area to be irrigated and the water source.

System information, such as details of the irrigators, direction of movement, numbers of outlets, flow requirements and the like may also be used in creating the irrigation plan.

Other parameters can also be set. For example, a user could set the time taken for a rotation, start-up and shutdown times and the like.

The Applicant's system is also capable of controlled delivery of chemicals (so-called 'chemigation') and/or fertilizers ('fertigation') to an area. Chemicals and/or fertilizers can be introduced into irrigators by various known injection systems. However, in contrast to prior systems, the Applicant's control arrangement allows precise delivery of desired amounts of chemicals and/or fertilizers to different parts of the area to be treated. In this case, the field information may include further information layers relating to soil needs (such as nutrient maps or mineral deficiency maps) and crop needs (such as infection maps showing crop diseases). The source information may include chemical and/or fertilizer information, which may also be input to the controller and relates to the chemicals and/or fertilizers being applied, their concentrations or rates of injection etc.

The Applicant's system therefore allows optimised application of chemicals or fertilizers, which avoids the unnecessary expense of over application. In addition, application through an existing irrigation system avoids the need for a separate spray applicator to be used, or the cost of hiring a spraying contractor.

An example of formulation of an irrigation plan will now be given with reference to FIGS. 6A to 6D.

Figure 6A:
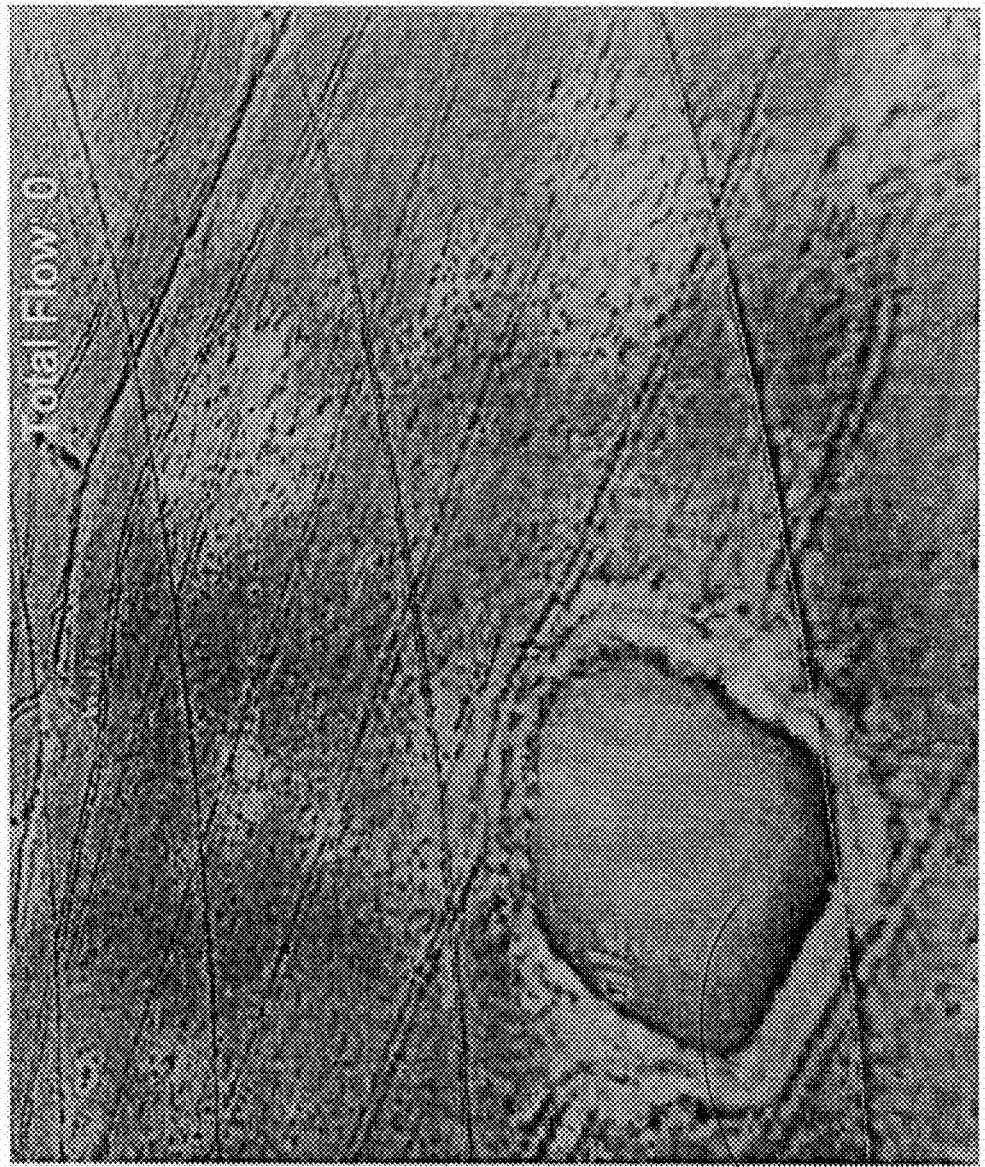

FIG. 6A is a screenshot showing an aerial photograph of an area to be irrigated. The variations in shading indicate different irrigation requirements. At the lower left, a pond or reservoir 30 is an area that is not to be irrigated. Automatically or by user-input, a boundary is defined around the pond or reservoir 30. This results in a mask as shown in FIG. 6B where the white area 31 is not to be irrigated.

Figure 6C:
Figure 6D:

FIG. 6C shows an adjustment layer based on soil type. The darker areas are to receive more water than lighter areas. FIG. 6D shows the resulting irrigation plan, drawn from the aerial photograph of FIG. 6A, the soil type map of FIG. 6C and the mask of FIG. 6B. Again, the darker the shading the more water is to be applied.

Figure 7:
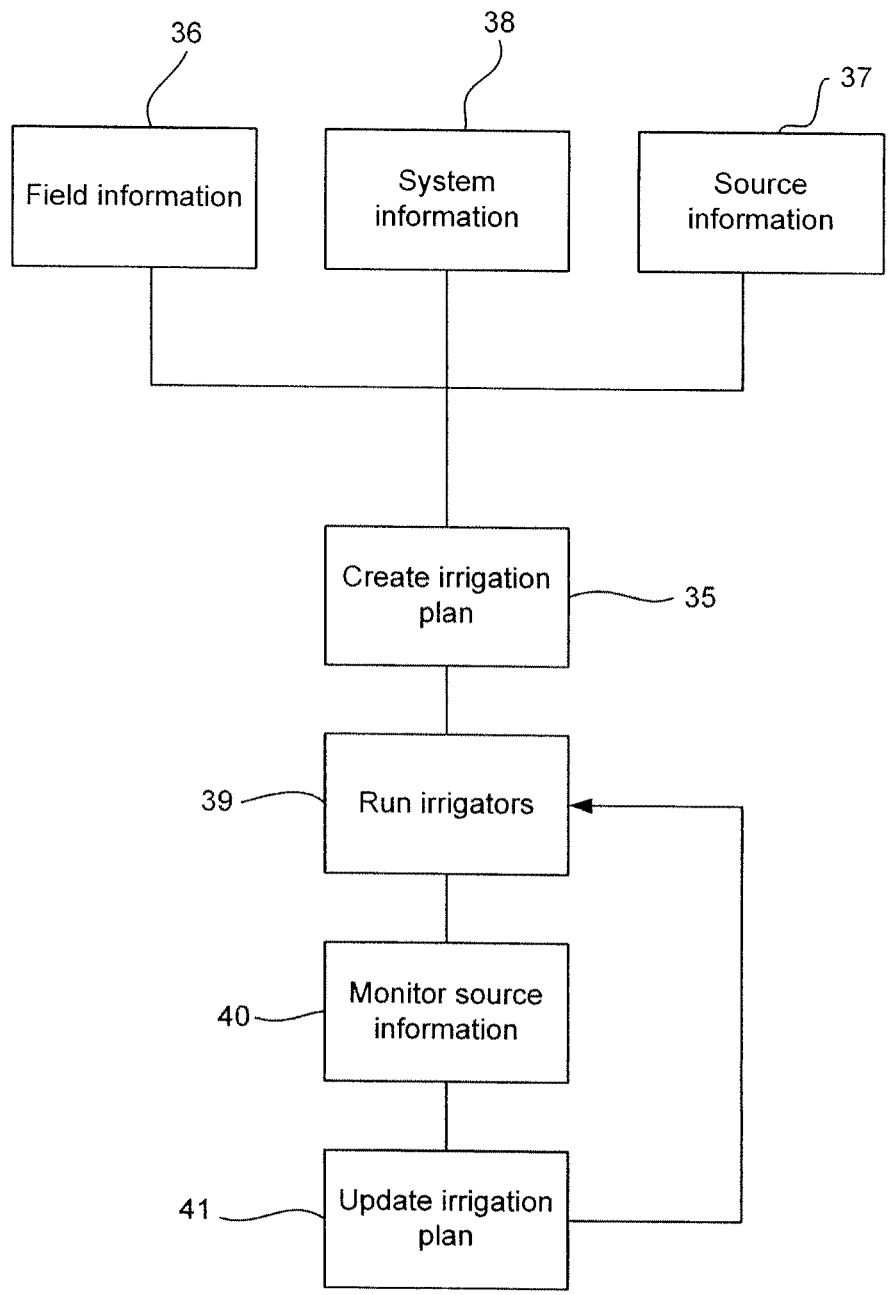
FIG. 7 is a flow chart showing the control steps of one embodiment.

FIG. 7 is a flow chart showing the operation of the control arrangement according to one embodiment. At step 35, the control arrangement creates an irrigation plan based on field information 36, source information 37 and system information 38. The control arrangement then implements the irrigation plan at step 39, running the irrigators and controlling irrigation parameters in accordance with the irrigation plan. The control arrangement may periodically or continuously monitor source information (step 40) and updates the irrigation plan (step 41) in accordance with the revised source information. The control arrangement may also monitor system and field information, and update the irrigation plan in accordance with that information. The irrigation plan can also be adapted in line with other manually or automatically updated information, such as changes in the weather.

The controller may also user longer term planning information in forming an irrigation plan. Such information could include meteorological information, such as the amount of rainfall expected over a season or other time period. Some farms are permitted a certain maximum water take per year, so a year may be a suitable time period for those farms.

The amount of rainfall expected reduces the amount of water which needs to be applied by the irrigation system and may also increase the amount of water available from a source (e.g. by refilling a reservoir). Similarly, longer term source information such as the expected availability of water over a season can be used. The needs of different crops over a season can be used, including variation of those needs over time (e.g. needs as a function of stage of the growth cycle; less water is applied to many crops as the harvest approaches etc).

Where the expected needs over a season exceed the expected availability of water, the Applicant's system implements a prioritisation process. This can be an automated or manual process. In one embodiment, a farmer is asked to assign priority weightings to areas or crops. Thus, a farmer is able to prioritise the most profitable crops, ensuring that the optimum amount of water is delivered to those crops. Less than optimum water will then necessarily be delivered to some less profitable crops. Similar prioritisations can be used in real time where desired water output is greater than an available water flow.

Such season plans can of course be updated manually or automatically in response to changing weather, field information and source information.

The Applicant's system is capable of switching individual valves, and therefore water flow through individual outlets on and off in any desired manner. In one embodiment the valves can be pulsed on and off with a relatively fast duty cycle, which provides complete freedom of water application across the area to be irrigated. The valves need not provide continuous adjustment of flow rate, allowing simple on/off valves to be used. Preferably the duty cycle for at least some valves is less than 10 minutes, preferably less than 5 minutes, more preferably in the range 10 seconds to 5 minutes.

Software for implementing the control steps may be stored on any suitable computer-readable medium.

Preferably the control arrangement interfaces with the Internet, such that irrigation can be monitored or irrigation parameters altered at any time over the Internet.

The system may be configured to suggest alternatives to a user, for optimised use of water.

The low power latching valve system reduces costs, power consumption and allows installation by relatively unskilled workers—i.e. a registered electrician is not required.

The Applicant's system uses field information to determine how much water is to be applied to each region of an area to be irrigated. While a zoning system could be used, it is preferable that this determination be made continuously across the entire area. That is, field information and/or the amount of water to be applied is regarded as continuous across the area to be irrigated. Each sprinkler is controlled in order to provide an appropriate amount of water to each piece of land as the irrigator passes over it.

The field information is received in 'layers' which allows many different types of field information to be considered. The use of manually entered and automatically gathered field information is allowed. The avoidance layer ensures that no water is delivered to areas where it would be undesirable.

The sophisticated use of such field information also helps to minimise undesirable nutrient runoff or nitrate leaching. This is good for the field, reduces expense to the farmer by keeping nutrients in the soil and also minimises environmental damage in adjacent waterways for example.

Furthermore, the Applicant's control system optimises water application based not only on the water requirements of the area to be irrigated, but also on the water source. This allows more efficient use of the available water resources, allowing available water to be used where it is most needed. In some circumstances this may allow a wider area to be irrigated from a particular water source, or an extra irrigator to be installed.

Software for implementing the control features of the Applicant's invention may be stored on any suitable computer readable medium. The controller may be a suitable computer or microprocessor capable of receiving the various information described above and storing the information in memory. The controller is capable of using that information in creating an irrigation plan or otherwise in controlling the operation of the irrigation system.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. An irrigation system including:
   a plurality of water outlets for delivering water to an area to be irrigated;
   a plurality of valves for controlling flow through the outlets; and
   a control arrangement configured to receive: source information relating to a water source; and field information relating to an area to be irrigated; the control arrangement being configured to control the valves so as to control flow through the outlets based at least in part on the source information and the field information, wherein the source information includes one or more of a maximum pressure and a minimum pressure, wherein the outlets are positioned on at least one irrigator, wherein the control arrangement is configured to control a speed of movement of the irrigator in response to the source information received by the control arrangement.

2. An irrigation system as claimed in claim 1 wherein the outlets are positioned on a plurality of irrigators.

3. An irrigation system as claimed in claim 2 wherein the irrigators are centre-pivot and/or lateral-move irrigators.

4. An irrigation system as claimed in claim 1 wherein the source information includes one or more water quota parameters.

5. An irrigation system as claimed in claim 1 wherein the source information includes one or more source pressure parameters.

6. An irrigation system as claimed in claim 5 wherein the source pressure parameters include an actual pressure.

7. An irrigation system as claimed in claim 1 wherein the source information includes one or more source flow parameters.

8. An irrigation system as claimed in claim 7 wherein the source flow parameters include one or more of: a maximum flow, a minimum flow and an actual flow.

9. An irrigation system as claimed in claim 1 wherein at least some of the source information is gathered and used to update irrigation parameters in real time.

10. An irrigation system as claimed in claim 1 wherein the control arrangement is configured to receive field information relating to the area to be irrigated and to control the valves so as to control flow through the outlets based in part on the field information.

11. An irrigation system as claimed in claim 10 wherein the field information includes one or more of: aerial photographs, soil type maps, soil moisture maps and conductivity maps.

12. An irrigation system as claimed in claim 10 wherein the field information includes one or more of: areas not to be irrigated, crop types and terrain information.

13. An irrigation system as claimed in claim 10 wherein the field information includes historical data.

14. An irrigation system as claimed in claim 1 wherein the control arrangement includes a central controller configured to create and send control signals.

15. An irrigation system as claimed in claim 14, wherein the outlets are positioned on at least one irrigator, wherein the control arrangement also includes a main controller for each irrigator in the irrigation system, each main controller receiving irrigator control signals from the central controller and controlling the valves on the corresponding irrigator in accordance with the control signals.

16. An irrigation system as claimed in claim 15, wherein the control arrangement also includes a plurality of node controllers for each irrigator in the irrigation system, each node controller receiving node control signals from one of the main controllers and controlling a subset of valves on the corresponding irrigator.

17. An irrigation system as claimed in claim 15 wherein the irrigator control signals are communicated over a wireless link.

18. An irrigation system as claimed in claim 16, wherein the node control signals are communicated over a wireless link.

19. An irrigation system as claimed in claim 18 wherein at least some of the node controllers also act as repeaters in the wireless link.

20. An irrigation system as claimed in claim 1 including one or more positioning systems configured to determine the position of each irrigator in the irrigation system.

21. An irrigation system as claimed in claim 20 wherein the positioning systems include one or more GPS receivers positioned on an irrigator.

22. An irrigation system as claimed in claim 20, wherein the positioning systems include one or more shaft encoders for determining rotational position of centre-pivot irrigators.

23. An irrigation system as claimed in claim 1 wherein the valves are latching valves.

24. An irrigation system as claimed in claim 1 wherein the control arrangement is configured to receive long term planning information and to control the valves based in part on this long term planning information.

25. An irrigation system as claimed in claim 24, wherein the long term planning information includes one or more of: expected crop needs, expected crop need as a function of time, expected rainfall, expected rainfall as a function of time, and expected availability of water.

26. An irrigation system as claimed in claim 24 wherein the plan is updated automatically or manually throughout the plan term due to changes in weather or other plan input conditions.

27. An irrigation system as claimed in claim 1, including a chemical and/or fertilizer injection system adapted to introduce chemicals and/or fertilizers into the water flow and wherein the source information includes chemical and/or fertilizer source information.

* * * * *